United States Patent
Liu et al.

(10) Patent No.: US 12,281,443 B2
(45) Date of Patent: Apr. 22, 2025

(54) PREPARATION METHOD AND RECYCLINGMETHOD FOR DEGRADABLE AND RECYCLABLE PAPER PLASTICS WITH WATER RESISTANCE AND HIGH-STRENGTH

(71) Applicant: Institute of Chemical Industry of Forest Products, Chinese Academy of Forestry, Nanjing (CN)

(72) Inventors: He Liu, Nanjing (CN); Xinxin Yang, Nanjing (CN); Bowen Zhang, Nanjing (CN); Shibin Shang, Nanjing (CN); Zhanqian Song, Nanjing (CN)

(73) Assignee: Institute of Chemical Industry of Forest Products, Chinese Academy of Forestry, Nanjing (CN)

( * ) Notice: Subject to any disclaimer, the term of this patent is extended or adjusted under 35 U.S.C. 154(b) by 0 days.

(21) Appl. No.: 18/661,717

(22) Filed: May 13, 2024

(65) Prior Publication Data
US 2024/0295078 A1    Sep. 5, 2024

Related U.S. Application Data

(63) Continuation of application No. PCT/CN2023/100928, filed on Jun. 19, 2023.

(30) Foreign Application Priority Data

Aug. 23, 2022 (CN) .......................... 202211013187.X

(51) Int. Cl.
*D21H 19/16* (2006.01)
*D21B 1/08* (2006.01)
(Continued)

(52) U.S. Cl.
CPC ............... *D21H 19/16* (2013.01); *D21B 1/08* (2013.01); *D21C 5/022* (2013.01); *D21H 11/14* (2013.01); *D21H 21/16* (2013.01); *D21J 1/04* (2013.01)

(58) Field of Classification Search
CPC .......... D21H 19/16; D21H 11/14; D21B 1/08; D21C 5/022
See application file for complete search history.

(56) References Cited

FOREIGN PATENT DOCUMENTS

| CN | 1373253 A | 10/2002 |
|----|-----------|---------|
| CN | 101456198 A * | 6/2009 |

(Continued)

OTHER PUBLICATIONS

English Machine translation CN101456198, Jun. 2009. (Year: 2009).*
(Continued)

*Primary Examiner* — Anthony Calandra
(74) *Attorney, Agent, or Firm* — George D. Morgan

(57) ABSTRACT

The present invention discloses a preparation method and recycling method for degradable and recyclable paper plastics with water resistance and high-strength. By coating cyclic carbonate and amine compounds on paper, these compounds penetrate the paper's fiber structure, followed by curing treatment, resulting in a recyclable, degradable, and reprocessed paper plastic material with water resistance and high-strength. This method involves coating only cyclic carbonate and amines onto the paper, which, after heating, yields the paper plastic. The invention offers versatility, enhancing various paper types with improved mechanical properties, temperature resistance, water resistance, and solvent resistance while maintaining degradation capability. The paper plastic exhibits excellent self-healing, plasticity, degradation, and reprocessing properties. The process (Continued)

method is straightforward and user-friendly, making it suitable for industrial-scale production.

8 Claims, 11 Drawing Sheets

(51) Int. Cl.
*D21C 5/02* (2006.01)
*D21H 11/14* (2006.01)
*D21H 21/16* (2006.01)
*D21J 1/04* (2006.01)

(56) References Cited

FOREIGN PATENT DOCUMENTS

| | | | |
|---|---|---|---|
| CN | 111485447 A | | 8/2020 |
| CN | 112979943 A | | 6/2021 |
| CN | 114915210 A | * | 8/2022 |

OTHER PUBLICATIONS

English Machine Translation CN112979943, Jun. 2021 (Year: 2021).*
English machine Translation CN114915210, Aug. 2022. (Year: 2022).*

* cited by examiner

PREPARATION METHOD AND RECYCLING METHOD FOR DEGRADABLE AND RECYCLABLE PAPER PLASTICS WITH WATER RESISTANCE AND HIGH-STRENGTH

CROSS-REFERENCE TO RELATED APPLICATIONS

The application claims priority to Chinese patent application No. 202211013187.X, filed on Aug. 23, 2022, the entire contents of which are incorporated herein by reference.

TECHNICAL FIELD

The present invention relates to the technical field of composite materials, in particular to a preparation method and recycling method for degradable and recyclable paper plastics with water resistance and high-strength.

BACKGROUND

Since the invention of plastics, their widespread use has significantly enhanced convenience in daily life. However, at the same time, the problem of plastic pollution is becoming increasingly serious, emerging as a pressing global environmental issue. Starting in 2021, China has officially upgraded its "plastic restriction order" to impose stricter restrictions on the production, sales, and use of plastic products. Nonetheless, the widespread adoption of degradable plastics as alternatives to plastic bags remains hindered by high costs and thereby challenges in meeting production capacity demands.

With a history spanning thousands of years, paper possesses excellent degradation capacity and has been considered a substitute for plastic in some packaging fields in recent years. However, its water resistance and mechanical strength lag significantly behind those of traditional plastic products.

SUMMARY

In response to problems existing in the prior art, the present invention provides a preparation method and recycling method for degradable and recyclable paper plastics with water resistance and high-strength. These paper-based composite materials are straightforward to prepare and can be produced in batches. The paper-based composite materials produced using this method address issues of poor water and solvent resistance of paper packaging materials and retain good flexibility while significantly enhancing mechanical strength. Meanwhile, compared with traditional plastic packaging materials that are prone to environmental pollution, these paper-based composites offer biodegradability, thereby greatly alleviating the problem of "white pollution". Additionally, these paper-based composite materials, once chemically degraded, can be reprocessed, facilitating resource reuse and reducing raw material costs to some extent, thereby yielding higher economic benefits.

To solve the above technical problems, the technical solution adopted by the present invention is as follows:

The preparation method for degradable and recyclable paper plastics with water resistance and high-strength includes the following steps:

1) stirring and mixing a cyclic carbonate compound and an amine compound uniformly at room temperature to 70° C. to obtain modified materials, where the amine compound is at least one of tetraethylenepentamine, polyethyleneimine, mixed amine AMIX1000, amino-modified cellulose, polyethylene polyamine, chitosan or tri (2-aminoethyl) amine; and 2) applying the modified materials prepared in step 1) onto paper, and performing curing at 65-130° C. for 0.5-6 hours or curing under 700-6000 W microwave irradiation for 1-15 minutes without hot pressing, to obtain degradable and recyclable paper-based composite materials with water resistance and high-strength.

The above room temperature includes a temperature range of 0-40° C. In step 1), stirring and mixing are preferably performed at room temperature.

The degradable and recyclable paper plastics with water resistance and high-strength refers to the paper plastic prepared in the present application, which is degradable and recyclable, possessing water resistance, high-strength, and self-healing properties.

In step 2), the paper reacts with the cyclic carbonate compound and the amine compound to form a composite. In step 2), no hot pressing operation is required to achieve good results. Operation steps are simple, and the obtained paper plastic exhibits excellent mechanical properties.

The above-prepared paper plastic has biodegradability and solves the problems of poor water resistance, poor solvent resistance, and low mechanical strength of the paper packaging materials. At the same time, paper plastic retains good flexibility of paper and can replace plastic products.

In this application, "paper plastic" refers to composite paper with plasticity and reprocessing properties akin to traditional plastics. Essentially, the material prepared herein is a form of paper. Due to strong water resistance, solvent resistance, high-temperature resistance, and mechanical strength, paper plastic has excellent plasticity and reprocessing properties, natural degradation, degradation and reprocessing, flexibility, and good self-repairing capacity, demonstrating better comprehensive properties than existing plastics. Therefore, in the field of packaging and other fields, paper plastic can effectively replace existing plastic.

In step 1), a preparation method of the cyclic carbonate compound includes steps of adding an epoxy compound and a catalyst in a molar ratio of 100 to (1-6) to a pressure reactor, exhausting air inside the reactor, then, introducing $CO_2$, maintaining pressure at 0.5-3.5 MPa, controlling reaction temperature at 50-120° C., and performing a stirring reaction for 6-48 hours to obtain the cyclic carbonate compound.

In step 1), the epoxy compound is at least one of the compounds containing binary or more epoxy groups, such as epoxy soybean oil, a rosin-derived epoxy compound, bisphenol A diglycidyl ether, 1,4-butanediol diglycidyl ether, epoxy terminated polyethylene glycol, a cellulose derived epoxy compound, or a lignin-based epoxy compound.

To enhance the transformation of the epoxy compound into the cyclic carbonate, in step 1), the catalyst is at least one of tetrabutylammonium bromide, tetrabutylammonium iodide, N,N-dimethylaminopyridine, benzyltrimethylammoniumchloride, or L-ascorbic acid.

In step 1), dosages of the cyclic carbonate compounds and the amine compound are added according to a molar ratio of cyclic carbonate groups to amino groups being (0.25 to 1) to (2 to 1). Too many amines can lead to too strong activity and too high reaction speed, making it difficult for the system to mix uniformly; but too few amines can lead to too low reaction speed, difficulty in cross-linking, and low molecular weight, whereby a polymer network cannot be formed.

In step 2), a coating manner of a mixture on the paper can be at least one of spray coating, scrape coating, brush coating, and dip coating.

The above-prepared paper-based composite materials possess water resistance, high-strength, recyclability, degradability, recoverability, self-healing, and other effects, and can replace existing plastic products.

A mass ratio of the above degradable and recyclable paper-modified materials water resistance high-strength to the paper is (0.25 to 1) to (2.5 to 1), preferably 1 to (1.7 to 1).

The above paper is any type of paper material prepared using cellulose.

Two or more layers of the degradable and recyclable paper plastics with water resistance and high-strength are overlaid, and hot pressing is performed at a pressure of 0.5-5 MPa and temperature of 70-120° C. for 0.5-2 hours to form the paper plastic board. Paper plastic can be used in fields such as packaging or home decoration.

After being buried in soil, the above-prepared degradable and recyclable paper plastics with water resistance and high-strength can be naturally degraded and is completely degraded after 4-6 months.

A recycling method for the above prepared degradable and recyclable paper plastics with water resistance and high-strength includes steps of soaking composite paper in a sodium hydroxide solution or anhydrous ethanol at a temperature of 70-100° C. for 5-6 hours, degrading non-isocyanate polyurethane in the paper plastic, performing filtration to obtain paper fibers, and performing reshaping by a paper sheet forming machine to produce new paper.

The strength recovery rate of reprocessed paper (compared with original paper) is not less than 97%.

The molar concentration of the above sodium hydroxide mentioned is 0.8-1.2 mol/L.

As another implementation, the recycling method of the above prepared degradable and recyclable paper plastics with water resistance and high-strength includes steps of crushing the paper plastic, and then performing hot pressing on the crushed paper plastic at a pressure of 1-2 MPa and temperature of 120-135° C. for 2-4 hours, to obtain new paper plastic.

Technologies not mentioned in the present invention are all based on the prior art.

Compared with the prior art, the present invention has the following beneficial technical effects:
according to the degradable and recyclable paper plastics with water resistance and high-strength prepared by the present invention, the cyclic carbonate and the amine compound are introduced into the paper, and the paper plastic can be obtained after heating for curing or microwave curing. The prepared composite paper still has degradation properties and is green and environmentally friendly. In addition, the prepared paper plastic can have excellent mechanical properties through chemical bonds and intermolecular interactions with the formed non-isocyanate polyurethane. The water resistance, solvent resistance, and high-temperature resistance of paper materials are also significantly improved. The obtained paper plastic has excellent self-healing properties, plasticity and reprocessing properties, and acid-base degradation and regeneration properties. Paper plastic is simple in preparation technology, easy to operate, convenient for large-scale industrial production, and can replace traditional plastic.

DETAILED DESCRIPTION OF THE EMBODIMENTS

In order to better understand the present invention, the content of the present invention will be further illustrated in conjunction with examples, but the content of the present invention is not limited to the following examples.

In each example, if the temperature is not specifically specified, it refers to operating at room temperature, which is 15-25° C.

Example 1

Figure 1:
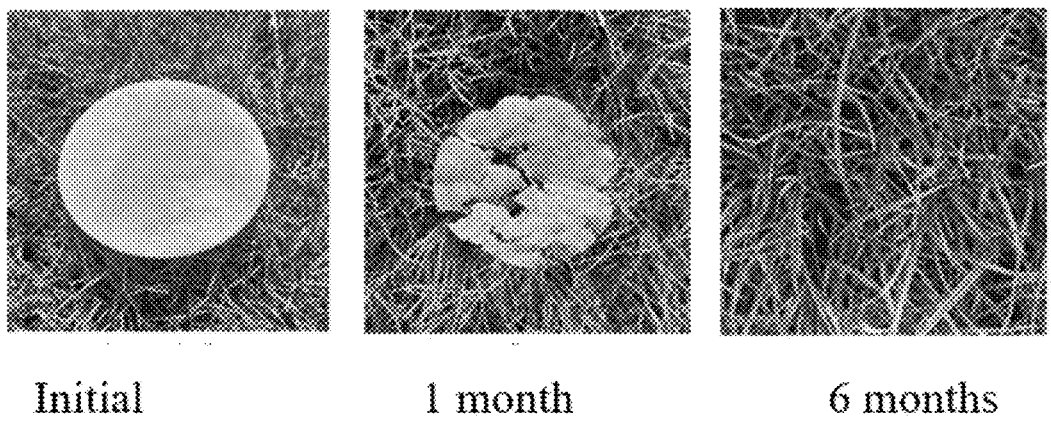
FIG. 1 shows a physical image of biodegradability demonstrated in Example 1.
Figure 2:
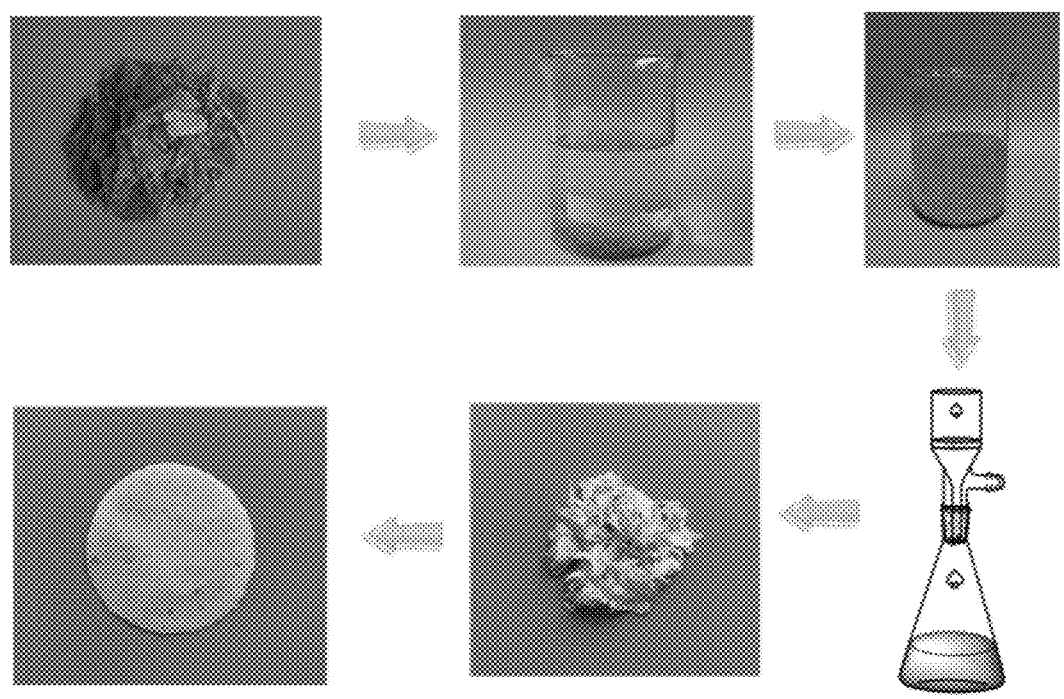
FIG. 2 shows a schematic diagram of a degradation and recovery course in Example 1.

Epoxy soybean oil (CP, article number E107074, 47 g, 45 mmol) purchased from Aladdin reagent was taken and added to a pressure reactor, tetrabutylammonium iodide (2 g) was added as a catalyst, and then carbon dioxide was repeatedly introduced into the pressure reactor three times to exhaust air inside the reactor, finally, the pressure was maintained at 2.5 MPa, the reaction temperature was controlled at 90° C., and after a stirring reaction for 8 hours, soybean oil-based cyclic carbonate was obtained. The soybean oil-based cyclic carbonate (6 g) was taken stirred and mixed uniformly with tetraethylenepentamine (1.5 g) at room temperature to obtain a mixture, the mixture was scrape-coated onto a surface of 7 g of printing paper, curing was performed at 80° C. for 3.5 hours, and paper plastic materials were obtained. The obtained paper plastic was buried in the soil and naturally degraded. As time went on, the paper plastic completely degraded after 6 months, as shown in FIG. 1. After the paper plastic was immersed in boiling sodium hydroxide of 1 M for 6 hours, the non-isocyanate polyurethane in the paper plastic was degraded, filtration was performed, recycling was performed to obtain paper fibers, and the new paper was prepared through a paper sheet forming machine, with a strength recovery rate of 97%, as shown in FIG. 2; the paper plastic was soaked in dimethyl sulfoxide, acetone, dichloromethane, and tetrahydrofuran for one week respectively, with almost no change in size (changes <0.2 mm). At the same time, scratches were made on the surface of the paper plastic using sandpaper, then the paper plastic with scratches was placed in a 130° C. oven, after 50 hours, the scratches disappeared, and the surface of the paper plastic returned to a flat state. In addition, the modified paper materials (the paper plastic obtained above) did not show any size change after being kept at 200° C. for 50 minutes.

| | Tensile strength (MPa) | Water absorption rate (%) | Natural degradation cycle (month) | Wet strength after soaking in water for one week (MPa) |
|---|---|---|---|---|
| Printing paper (before compositing) | 13.2 | 120 a day | 1 | 0.22 MPa |
| Paper plastic | 139 | 8 a week | 6 | 127 MPa |

After scrape coating in Example 1, under microwave irradiation with a power of 6000 W for 1 minute, curing can also be completed, and properties remain basically unchanged, which will not be repeated.

A testing method for a water absorption rate: after being completely soaked in water for a certain period, a sample was taken out, the surface moisture of the sample was dried up, the dried sample was weighed, and a formula $(W-W0)/W0$ was used to calculate the water absorption rate, where W is the weight after water absorption, and W0 is initial weight.

Example 2

Figure 3:
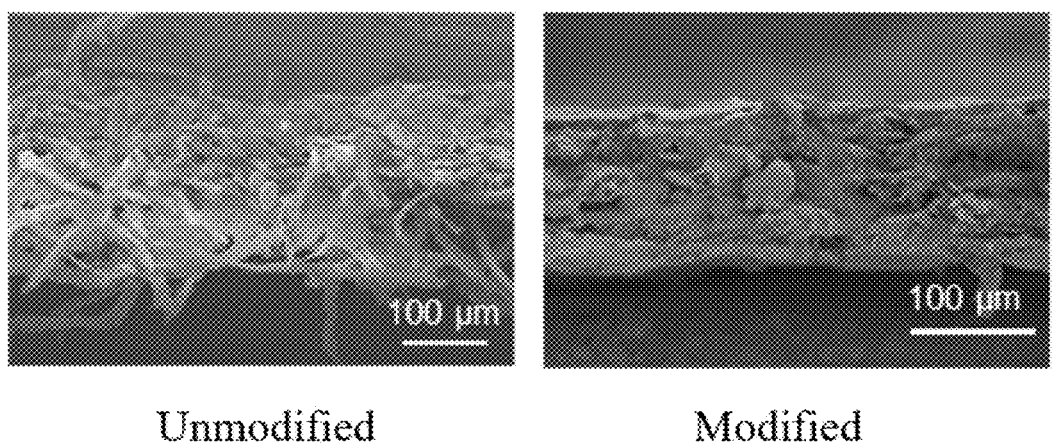
FIG. 3 shows cross-sectional scanning electron microscopy images of filter paper before and after modification in Example 2.
Figure 4:
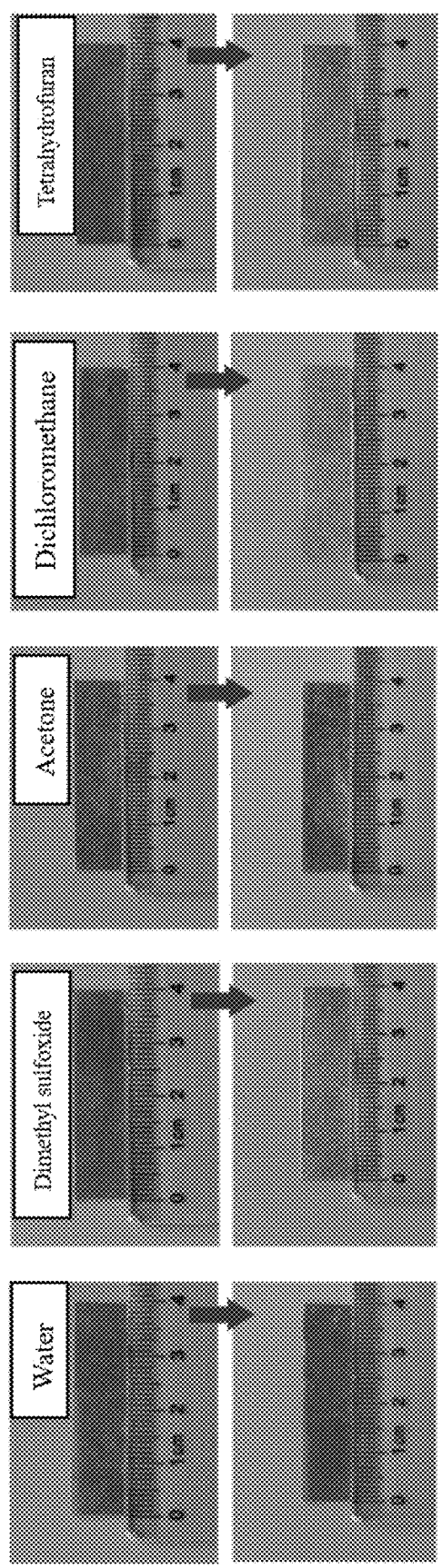
FIG. 4 shows physical images of Example 2 after soaking in different solvents for one week.
Figure 5:
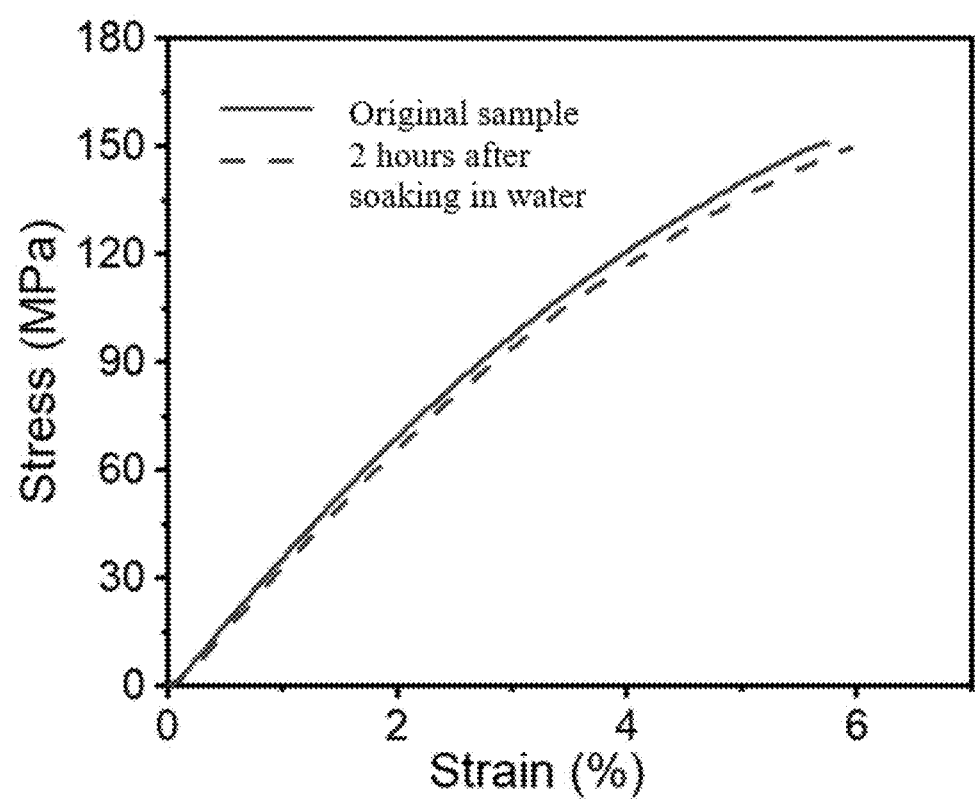
FIG. 5 shows a stress-strain curve of Example 2.

Triglycidyl ether of fumaropimaric acid (5.86 g, 10 mmol) was taken and added to a pressure reactor, tetrabutylammonium iodide (0.5 g) and L-ascorbic acid (0.2 g) were added as a catalyst, carbon dioxide was repeatedly introduced into the pressure reactor three times to exhaust air inside the reactor, finally, the pressure was maintained at 2 MPa, the reaction temperature was controlled at 80° C., and after a stirring reaction for 12 hours, rosin-based cyclic carbonate was obtained. The rosin-based cyclic carbonate (5 g) was stirred and mixed uniformly with polyethyleneimine (1.28 g) at room temperature to obtain a mixture, the mixture was brush-coated onto a surface of 7.85 g of ordinary medium-speed qualitative filter paper, curing was performed at 70° C. for 4 hours to obtain paper plastic materials, and tensile strength of the paper plastic materials can reach 151 MPa. FIG. 3 shows cross-sectional scanning electron microscopy images of the filter paper before and after modification, and it can be seen that modified fibers are tightly and orderly bonded. After the obtained paper plastic was soaked in water at room temperature for one week, the tensile strength of the paper plastic still retained a high value of 129 MPa. The water absorption capacity of the paper plastic after being kept in the water for one week was measured, the paper plastic at this time only had the water absorption rate of 10%, while the water absorption rate of the filter paper reached 160% on the first day. The obtained paper plastic was buried in the soil and completely degraded after 6 months. The paper plastic was immersed in boiling sodium hydroxide of 1M for 6 hours, filtration was performed to obtain paper fibers, and then the new paper was prepared through a paper sheet forming machine, with a strength recovery rate of 97.6%. After the paper plastic was kept in an organic solvent for one week, as shown in FIG. 4, changes were less than 0.2 mm, good dimensional stability can be still maintained, and the paper plastic showed good solvent resistance. A tensile stress-strain curve of the paper plastic before and after being soaked in the water is shown in FIG. 5, which shows that soaking in the water for 2 hours hardly affects the mechanical properties of the paper plastic. At the same time, scratches were made on the surface of the paper plastic using sandpaper, then the paper plastic with the scratches was placed in a 150° C. oven, after 30 hours, the scratches disappeared, and the surface of the paper plastic returned to a flat state. The paper plastic was crushed to an outer diameter of less than 1 cm, then the crushed paper plastic was subjected to hot pressing at 125° C. and pressure of 2 MPa for 2.5 hours, and new paper plastic could be obtained. The mechanical properties were restored to 85% or above, and degradation, water resistance, solvent resistance, high-temperature resistance, and self-repairing properties were basically not affected. In addition, the modified paper materials (the paper plastic obtained above) did not show any size change after being kept at 200° C. for 30 minutes.

| | Tensile strength (MPa) | Water absorption rate (%) | Natural degradation cycle (month) | Wet strength after soaking for one week (MPa) |
|---|---|---|---|---|
| Medium-speed qualitative filter paper (before compositing) | 8.9 | 160 a day | 1 | 0.19 MPa |
| Paper plastic | 151 | 10 a week | 6 | 129 MPa |

After scrape coating in Example 1, under microwave irradiation with a power of 3000 W for 2 minutes, curing can also be completed, and properties remain basically unchanged, which will not be repeated.

Example 3

Figure 6:
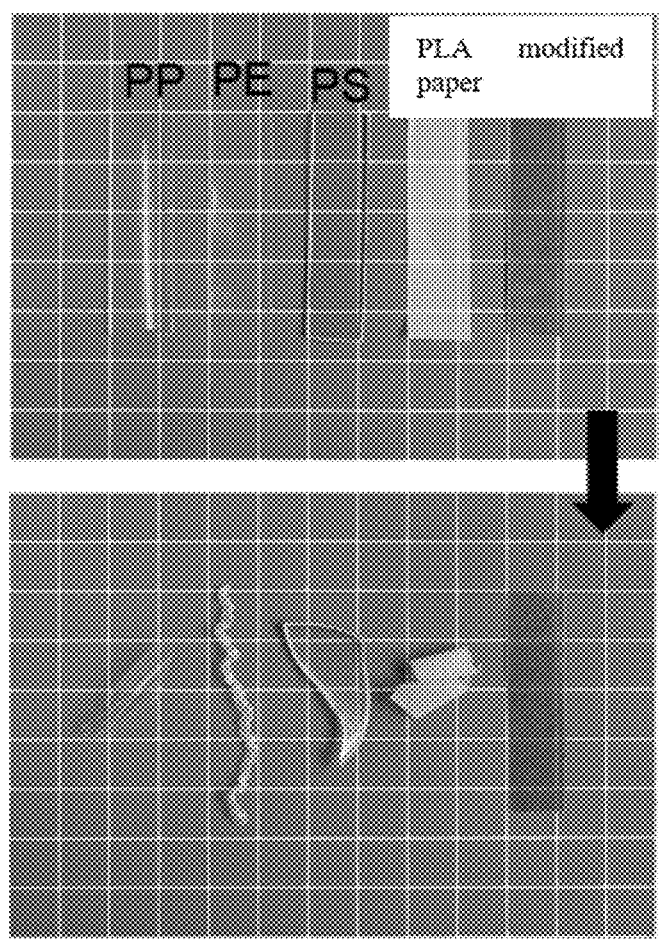
FIG. 6 shows original images of modified paper materials and commonly used plastic in Example 3, as well as images of the modified paper materials kept at 200° C. for 30 minutes and several commonly used plastics kept at 200° C. for 5 minutes.

Bisphenol A diglycidyl ether (17 g, 50 mmol) was taken and added to a pressure reactor, N,N-dimethylaminopyridine (1 g) was added as a catalyst, then carbon dioxide was repeatedly introduced into the pressure reactor three times to exhaust air inside the reactor, finally, the pressure was maintained at 3 MPa, the reaction temperature was controlled at 100° C., and after a stirring reaction for 10 hours, bisphenol A based cyclic carbonate was obtained. The bisphenol A-based cyclic carbonate (5 g) was taken mixed and stirred uniformly with polyethylene polyamine (2.12 g) at room temperature to obtain a mixture, the mixture was scrape-coated onto a surface of 8.3 g of ordinary medium-speed quantitative filter paper, curing was performed at 100° C. for 2 hours, and paper plastic materials were obtained. The mechanical properties of the paper plastic were tested, and the tensile strength of the paper plastic can reach 147 MPa. After the paper plastic was soaked in water at room temperature for one week, the tensile strength still retained a high value of 126 MPa, indicating that the paper plastic has excellent water resistance. At the same time, scratches were made on the surface of the paper plastic using sandpaper, and then the paper plastic with scratches was placed in a 120° C. oven, after 1 hour, the scratches disappeared, and the surface of the paper plastic returned to a flat state. The paper plastic was crushed to an outer diameter of less than 1 cm, then the crushed paper plastic was subjected to hot pressing at 135° C. and pressure of 2 MPa for 3 hours, and new paper plastic can be obtained. The mechanical properties were restored to 85% or above, and degradation, water resistance, solvent resistance, high-temperature resistance, and self-repairing properties were basically not affected. In addition, modified paper materials (the paper plastic obtained above) were kept at 200° C. for 30 minutes, the materials remained unchanged in their original shape, and the mechanical strength can still reach 125 MPa, while several commonly used plastic deformed after being kept at 200° C. for 5 minutes, as shown in FIG. 6. The obtained paper plastic was buried in the soil and completely degraded after 6 months. After the paper plastic was immersed in boiling hydrochloric acid of 1 M for 6 hours, filtration was performed, recycling was performed to obtain paper fibers and the new paper was prepared through a paper sheet forming machine, with a strength recovery rate of 97.9%; and the paper plastic was soaked in dimethyl sulfoxide, acetone, dichloromethane, and tetrahydrofuran for one week respectively, with almost no change in size (changes <0.2 mm).

|  | Tensile strength (MPa) | Water absorption rate (%) | Natural degradation cycle (month) | Wet strength after soaking for one week (MPa) |
| --- | --- | --- | --- | --- |
| Medium-speed qualitative filter paper (before compositing) | 8.9 | 160 a day | 1 | 0.19 |
| Paper plastic | 147 | 12 a week | 6 | 126 |

After scrape coating in Example 1, under microwave irradiation with a power of 700 W for 15 minutes, curing can also be completed, and properties remain basically unchanged, which will not be repeated.

Example 4

Figure 7:
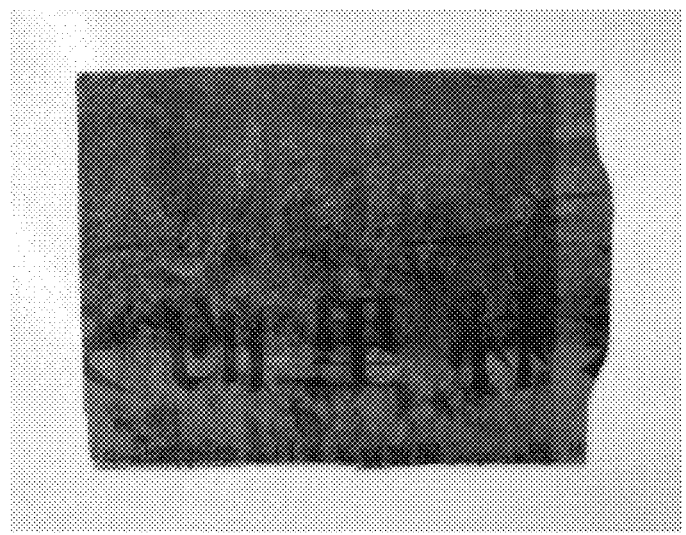
FIG. 7 shows a physical image of paper plastic obtained in Example 4.

Epoxy soybean oil (5 g, 4.3 mmol) was taken and added to a pressure reactor, tetrabutylammonium iodide (0.2 g) was added as a catalyst, then carbon dioxide was repeatedly introduced into the pressure reactor three times to exhaust air inside the reactor, finally, the pressure was maintained at 1 MPa, the reaction temperature was controlled at 70° C., and after a stirring reaction for 15 hours, soybean oil-based cyclic carbonate was obtained. The soybean oil-based cyclic carbonate (6 g) was taken and stirred and mixed uniformly with tri (2-aminoethyl) amine (2.8 g) at room temperature to obtain a mixture, the mixture was scrape-coated onto a surface of 8 g of used newspaper, curing was performed at 120° C. for 6 hours, and paper plastic materials were obtained, as shown in FIG. 7, and the tensile strength of the materials was 122 MPa. The waste newspaper was used in a course for composite modification, and the application fields of the method were also broadened. At the same time, scratches were made on the surface of the paper plastic using sandpaper, and then the paper plastic with scratches was placed in a 140° C. oven, after 1 hour, the scratches disappeared, and the surface of the paper plastic returned to a flat state. The paper plastic was crushed to an outer diameter of less than 1 cm, then the crushed paper plastic was subjected to hot pressing at 120° C. and pressure of 2 MPa for 4 hours, and new paper plastic can be obtained. The mechanical properties were restored to 85% or above, and degradation, water resistance, solvent resistance, high-temperature resistance, and self-repairing properties were basically not affected. The obtained paper plastic was buried in the soil and completely degraded after 6 months. After the paper plastic was immersed in boiling anhydrous ethanol for 5 hours, filtration was performed, recycling was performed to obtain paper fibers and the new paper was prepared through a paper sheet forming machine, with a strength recovery rate of 98.1%; and the paper plastic was soaked in dimethyl sulfoxide, acetone, dichloromethane, and tetrahydrofuran for one week respectively, with almost no change in size (changes <0.2 mm).

|  | Tensile strength (MPa) | Water absorption rate (%) | Natural degradation cycle (month) | Wet strength after soaking for one week (MPa) |
| --- | --- | --- | --- | --- |
| Newspaper (before compositing) | 13.2 | 182 a day | 1.5 | 0.6 |
| Paper plastic | 122 | 18 a week | 6 | 96 |

After scrape coating in Example 1, under microwave irradiation with a power of 1000 W for 5 minutes, curing can also be completed, and properties remain basically unchanged, which will not be repeated.

Example 5

Figure 8:
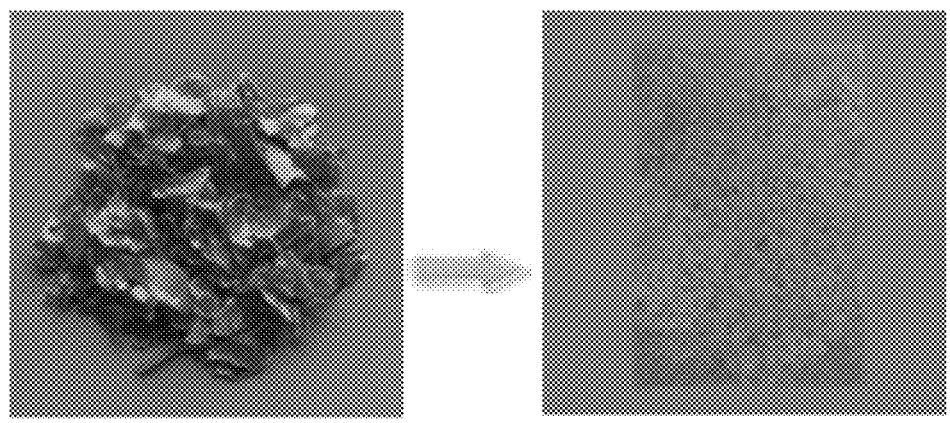
FIG. 8 shows a physical image of the paper plastic obtained through performing re-hot pressing on crushed paper plastic obtained in Example 5.

Epoxy soybean oil (47 g, 45 mmol) was taken and added to a pressure reactor, tetrabutylammonium iodide (2 g) was added as a catalyst, and then carbon dioxide was repeatedly introduced into the pressure reactor three times to exhaust air inside the reactor, finally, the pressure was maintained at 2 MPa, the reaction temperature was controlled at 80° C., and after a stirring reaction for 10 hours, soybean oil-based cyclic carbonate was obtained. The soybean oil-based cyclic carbonate (5.53 g) was taken and stirred and mixed uniformly with polyethyleneimine (1.97 g) at room temperature to obtain a mixture, the mixture was scrape-coated onto a surface of 9 g of kraft paper, curing was performed at 130° C. for 2.5 hours, and paper plastic materials were obtained. Scratches were made on the surface of the paper plastic using sandpaper, then the paper plastic with scratches was placed in a 130° C. oven, after 0.5 hours, the scratches disappeared, and the surface of the paper plastic returned to a flat state, indicating the self-repairing capacity of the paper plastic. The paper plastic was crushed to an outer diameter of less than 1 cm, then the crushed paper plastic was subjected to hot pressing at 130° C. and pressure of 1 MPa for 3.5 hours, and new paper plastic can be obtained, as shown in FIG. 8. The mechanical properties were restored to 85% or above, and degradation, water resistance, solvent resistance, high-temperature resistance, and self-repairing properties were basically not affected. The obtained paper plastic was buried in the soil and completely degraded after 6 months. After the paper plastic was immersed in boiling sodium hydroxide of 1 M for 6 hours, filtration was performed, recycling was performed to obtain paper fibers, and the new paper was prepared through a paper sheet forming machine, with a strength recovery rate of 97.3%; and the paper plastic was soaked in dimethyl sulfoxide, acetone, dichloromethane, and tetrahydrofuran for one week respectively, with almost no change in size (changes <0.2 mm).

|  | Tensile strength (MPa) | Water absorption rate (%) | Natural degradation cycle (month) | Wet strength after soaking for one week (MPa) |
|---|---|---|---|---|
| Kraft paper (before compositing | 38 | 80 a day | 2 | 4.8 |
| Paper plastic | 183 | 6.5 a week | 6 | 168 |

After scrape coating in Example 1, under microwave irradiation with a power of 2000 W for 5 minutes, curing can also be completed, and properties remain basically unchanged, which will not be repeated.

Example 6

Figure 9:
FIG. 9 shows a physical image of paper plastic obtained in Example 6.
Figure 10:
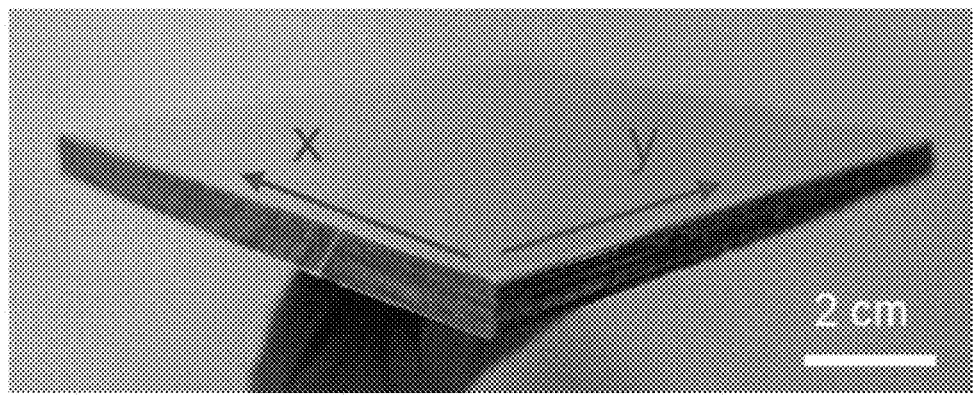
FIG. 10 shows a physical image of a multi-layer paper plastic board obtained in Example 6.
Figure 11:
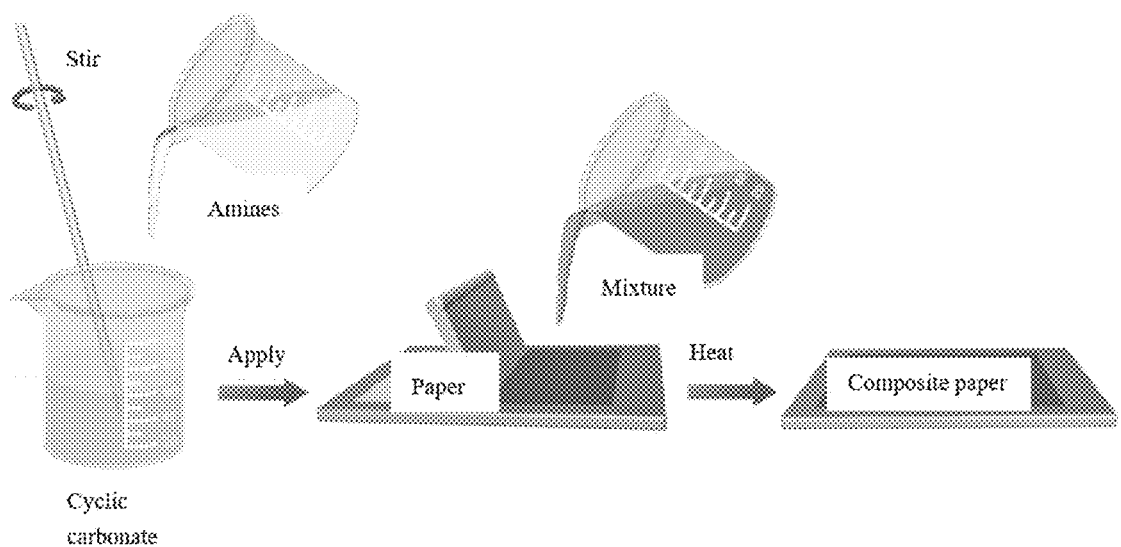
FIG. 11 shows a preparation flow chart of the paper plastic of the present invention.

Epoxy soybean oil (CP, article number E107074, 47 g, 45 mmol) was taken and added to a pressure reactor, tetrabutylammonium iodide (2 g) was added as a catalyst, then carbon dioxide was repeatedly introduced into the pressure reactor three times to exhaust air inside the reactor, finally, the pressure was maintained at 2 MPa, the reaction temperature was controlled at 80° C., and after a stirring reaction for 15 hours, soybean oil-based cyclic carbonate was obtained. Diglycidyl ether of acrylic adduct of levopimaric acid (4.86 g, 10 mmol) was taken and added to the pressure reactor, and the tetrabutylammonium iodide (0.5 g) and L-ascorbic acid (0.2 g) were added as a catalyst, carbon dioxide was repeatedly introduced into the pressure reactor three times to exhaust air inside the reactor, finally, the pressure was maintained at 2 MPa, the reaction temperature was controlled at 80° C., and after a stirring reaction for 12 hours, rosin-based cyclic carbonate was obtained. 3100 g of cyclic carbonate of the epoxy soybean oil and 500 g of cyclic carbonate of acrylic adduct of levopimaric acid were taken and added to 1400 g of polyethyleneimine, uniform mixing was performed to obtain a mixture, the mixture was coated onto 5000 g of paper, and after being cured by 5000 W microwave radiation for 90 seconds, high-strength paper plastic can be obtained. A physical image of the obtained paper plastic is shown in FIG. 9. After being overlaid, multiple sheets of paper plastic were subjected to hot pressing at 90° C. for 50 minutes under a pressure of 2 MPa in a hot press machine. Through a bond exchange reaction between the paper plastic and the paper plastic, overlaying of the multiple layers of paper plastic can be well achieved, and a paper plastic board can be prepared. A physical image of the paper plastic board is shown in FIG. 10. Mechanical compression strength of the plastic board can reach 120 MPa, whereby the paper plastic board can be used as building boards or furniture boards.

What is claimed is:

1. A preparation method for degradable and recyclable paper plastics with water resistance and high-strength, comprising the following steps:
    1) stirring and mixing a cyclic carbonate compound with an amine compound uniformly at room temperature to 70° C. to obtain modified materials, wherein the amine compound is at least one of tetraethylenepentamine, polyethyleneimine, polyethylene polyamine or tri (2-aminoethyl) amine; and
    2) applying the modified materials prepared in step 1) onto paper, and performing curing at 65-130° C. for 0.5-6 hours or curing under 700-6000 W microwave irradiation for 1-15 minutes, without hot pressing, to obtain degradable and recyclable paper plastics with water resistance and high-strength,
    wherein the degradable and recyclable paper plastic is recycled by the following method: crushing the degradable and recyclable paper plastic, and then performing hot pressing on the crushed paper plastic at a pressure of 1-2 MPa and temperature of 120-135° C. for 2-4 hours, to obtain new paper plastic.

2. The preparation method for degradable and recyclable paper plastics with water resistance and high-strength according to claim 1, wherein in step 2), a mass ratio of the modified materials to the paper is (0.25 to 1) to (2.5 to 1), and the paper is any type of paper materials prepared from cellulose.

3. The preparation method for degradable and recyclable paper plastics with water resistance and high-strength according to claim 1, wherein in step 1), dosages of the cyclic carbonate compounds and the amine compound are added according to a molar ratio of cyclic carbonate groups to amino groups being (0.25 to 1) to (2 to 1).

4. The preparation method for degradable and recyclable paper plastics with water resistance and high-strength according to claim 1, wherein in step 1), a preparation method of the cyclic carbonate compound comprises steps of adding an epoxy compound and a catalyst in a molar ratio of 100 to (1-6) to a pressure reactor, exhausting air inside the reactor, then, introducing $CO_2$, maintaining pressure at 0.5-3.5 MPa, controlling reaction temperature at 50-120° C., and performing a stirring reaction for 6-48 hours to obtain the cyclic carbonate compound.

5. The preparation method for degradable and recyclable paper plastics with water resistance and high-strength according to claim 4, wherein the epoxy compound is at least one of compounds containing binary and more epoxy groups, such as epoxy soybean oil, a rosin-derived epoxy compound, bisphenol A diglycidyl ether, 1,4-butanediol diglycidylether, epoxy terminated polyethylene glycol, a cellulose derived epoxy compound, or a lignin-based epoxy compound.

6. The preparation method for degradable and recyclable paper plastics with water resistance and high-strength according to claim 4, wherein the catalyst is at least one of tetrabutylammonium bromide, tetrabutylammonium iodide, N, N-dimethylaminopyridine, benzyltrimethylammonium chloride, or L-ascorbic acid.

7. The preparation method for degradable and recyclable paper plastics with water resistance and high-strength according to claim 1, wherein the degradable and recyclable paper plastic is degraded by the following method: burying the degradable and recyclable paper plastic in soil, and performing natural degradation, wherein the paper plastic buried in the soil is completely degraded after 4-6 months.

8. A preparation method for degradable and recyclable paper plastics with water resistance and high-strength, comprising the following steps:
    1) Stirring and mixing a cyclic carbonate compound with an amine compound uniformly at room temperature to 70° C. to obtain modified materials, wherein the amine compound is at least one of tetraethylenepentamine, polyethyleneimine, polyethylene polyamine or tri (2-aminoethyl) amine; and
    2) Applying the modified materials prepared in step 1) onto paper, and performing curing at 65-130° C. for 0.5-6 hours or curing under 700-6000 W microwave irradiation for 1-15 minutes, without hot pressing, to obtain degradable and recyclable paper plastics with water resistance and high-strength,
    wherein the degradable and recyclable paper plastic is recycled by the following method: soaking the degradable and recyclable paper plastic in a sodium hydroxide solution or anhydrous ethanol at a temperature of 70-100° C. for 5-6 hours, degrading non-isocyanate polyurethane in the paper plastic, performing filtration to obtain paper fibers, and performing reshaping by a paper sheet forming machine to produce new paper, wherein molar concentration of sodium hydroxide is 0.8-1.2 mol/L.

* * * * *